(12) United States Patent
Chuang et al.

(10) Patent No.: US 8,665,704 B2
(45) Date of Patent: Mar. 4, 2014

(54) PARALLELLY COUPLED STACKABLE NETWORK SWITCHING DEVICE

(75) Inventors: Keng Hua Chuang, Johor (MY); Kum Cheong Adam Chan, Singapore (SG); Kian Teck Poh, Singapore (SG)

(73) Assignee: Hewlett-Packard Development Company, L.P., Houston, TX (US)

( * ) Notice: Subject to any disclaimer, the term of this patent is extended or adjusted under 35 U.S.C. 154(b) by 143 days.

(21) Appl. No.: 13/304,463

(22) Filed: Nov. 25, 2011

(65) Prior Publication Data

US 2013/0136124 A1 May 30, 2013

(51) Int. Cl.
*H04J 1/16* (2006.01)
(52) U.S. Cl.
USPC .......................................... 370/217; 370/222
(58) Field of Classification Search
USPC .......................................... 370/217–222, 389
See application file for complete search history.

(56) References Cited

U.S. PATENT DOCUMENTS

| | | | |
|---|---|---|---|
| 6,145,024 A | 11/2000 | Maezawa et al. | |
| 6,801,527 B1 * | 10/2004 | O'Keeffe et al. | 370/386 |
| 7,319,664 B2 * | 1/2008 | Chen et al. | 370/217 |
| 7,352,707 B2 * | 4/2008 | Ho et al. | 370/256 |
| 7,466,653 B1 * | 12/2008 | Cohen et al. | 370/235 |
| 7,505,403 B2 * | 3/2009 | Santoso et al. | 370/219 |
| 7,548,549 B2 | 6/2009 | Bergeron et al. | |
| 7,593,320 B1 * | 9/2009 | Cohen et al. | 370/217 |
| 7,756,015 B1 * | 7/2010 | Bishara et al. | 370/218 |
| 8,102,630 B2 * | 1/2012 | Abdul Kader Jailani | 361/54 |
| 8,248,922 B2 * | 8/2012 | Rose et al. | 370/222 |
| 2004/0165525 A1 | 8/2004 | Burak | |
| 2005/0105560 A1 * | 5/2005 | Mann et al. | 370/503 |
| 2010/0284414 A1 * | 11/2010 | Agarwal et al. | 370/401 |
| 2011/0038286 A1 | 2/2011 | Ta et al. | |

FOREIGN PATENT DOCUMENTS

WO WO2009/026747 A1 3/2009

* cited by examiner

*Primary Examiner* — Brenda H Pham

(57) ABSTRACT

A network switching device includes at least two stacking ports, each stacking port being connectable via a stacking cable to a stack including at least one external network switching device. The device further includes an internal communication medium coupled to the stacking ports and capable of transmitting a frequency division multiplexed signal between the stacking ports. The device further includes a network switch and an interface to enable communication between the network switch and the internal communication medium. The interface includes a parallel coupling to the internal communication medium such that a signal with one carrier frequency being communicated between the network switch and the internal communication medium does not interfere with transmission between the two stacking ports of a signal with a different carrier frequency.

10 Claims, 4 Drawing Sheets

PARALLELLY COUPLED STACKABLE NETWORK SWITCHING DEVICE

BACKGROUND

Network switch stacking technology may enable increasing a number of network switches that may be managed using a single Internet Protocol (IP) address. In this manner, the stacked network switches may be operated from outside the stack as a single switch. However, the number of network data ports of the switch stack may be equal to the sum of all of the network data ports of the individual network switches.

A network switch for use in stacking technology may include a network switch that may function alone, but is connectable to other network switches. For example, a stackable network switch, in addition to network data ports, may include stacking ports or modules. Two network switches may be stacked by connecting a stacking cable between the stacking ports of the two network switches. By connecting free stacking ports of the stacked network switches to additional network switches, the size of the switch stack may be further increased.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

DETAILED DESCRIPTION

Figure 1A:
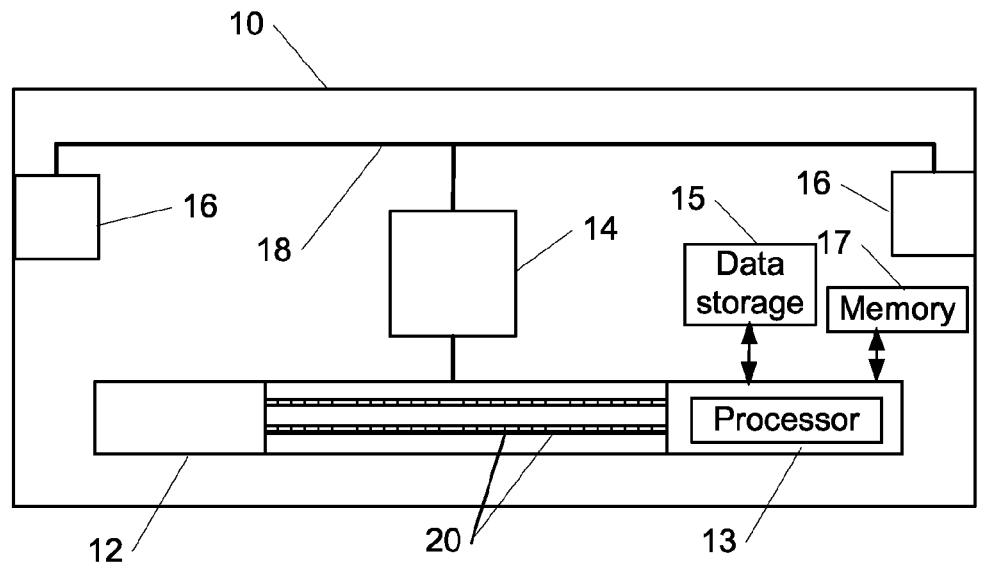
FIG. 1A is a schematic drawing of an example of a parallelly coupled network switching device.

In accordance with an example of stackable network switching, an parallelly coupled network switching device may be configured to be interconnected with other network switching devices to form a switch stack. A network switch of each parallelly coupled network switching device may be directly addressed by another network switch in the stack. When not addressed, each parallelly coupled network switching device in the switch stack may simply enable transmission of signals from one stacking port of the device to another. In this manner, in the event of failure of a network switch of a parallelly coupled network switching device in the switch stack, the remaining functional network switches may continue to operate efficiently.

An example of an parallelly coupled network switch device may include a network switch that communicates with stacking ports of the device via a parallelly coupled addressable interface. For example, two or more stacking ports of the device may be connected to one another via an internal communication medium. The internal communication medium may include an electrical connection (e.g. coaxial cable), an optical connection (e.g. optical fiber or other beam of light), a guided electromagnetic wave, or any other suitable communications medium. Communication between the internal communication medium and the network switch may not disturb, interfere with, or impede transmission of a signal between the stacking ports of the device.

The network switch of each parallelly coupled network switching device may be coupled to the internal communication medium via an parallelly coupled addressable interface. Each parallelly coupled network switching device may be characterized by a unique Media Access Control address (MAC address). For example, the parallelly coupled parallelly coupled addressable interface may include a component for coupling to the internal communication medium (e.g. for sensing a signal being transmitted by the medium) and a broad band receiving function for receiving frequencies being transmitted in the network. For example, the stacking cables may concurrently carry a plurality of signals by utilizing frequency division multiplexing (FDM). For example, a coupling component may include a component for sensing an electrical signal (e.g. a coupling transformer) or an optical signal (e.g. an optical coupler). The signal content (e.g. a data packet) may be demodulated from its carrier frequency and analyzed. If the signal content (e.g. as indicated by a destination MAC address in a field of the packet header) is addressed to the network switch of the parallelly coupled network switching device, the signal content may be transferred to the network switch. Thus, the network switch of the parallelly coupled network switching device may be accessible by a signal that is addressed to that network switch.

When two or more parallelly coupled network switching devices are connected to form a stack, each network switch may communicate directly to any other network switch of the stack. For example, the parallelly coupled addressable interface of each of the individually addressable network switching devices may be provided with a transmission function. The transmission function enables one of the stacked parallelly coupled network switching device to generate a signal by modulating with a selectable carrier frequency. For example, one parallelly coupled network switching device may generate a signal (e.g. a data packet that includes a destination address) with a carrier frequency that is assigned for communication with a destination parallelly coupled network switching device.

The signal may propagate through intervening devices of the stack (e.g. along the internal communication medium of the intervening devices) without interacting with them. Thus, failure of one or more of the network switches or parallelly coupled addressable interfaces to operate may not affect communication between other network switching devices of the stack.

On the other hand, in the absence of a parallelly coupled addressable interface, e.g. as with some prior art stackable network switches, each network switch in a stack would be connected in series to an adjacent network switch of the stack. Each signal would be transmitted in series (e.g. sequentially, one after the other) along the communication medium. When thus connected in series, a signal transmitted from a first network switch to a second network switch of the stack would traverse and interact with any intervening network switches. For example, each such network switch would read an incoming packet, and if addressed to another network switch, would transmit it to the next network switch in the stack. Thus, if one of the intervening network switches were to fail, the communications path via the failed network switch would be blocked. One solution within the limitation of series connections could be to provide redundancy in the form of additional series paths. For example, network switches at both ends of the stack could be connected to one another. However, even in the case of redundant connections, if a signal would be forced by failure of a network switch to traverse an alternate longer path, efficiency of the communication could be reduced.

FIG. 1A is a schematic drawing of an example of a parallelly coupled network switching device.

Parallelly coupled addressable network switching device 10 includes a network switch 12. Network switch 12 may include a plurality of network data ports 20. Network switch 12 may route a data signal to a network cable via one or more of network data ports 20. Network switch 12 may include processing capability in the form of a switch processor 13. Switch processor 13 may include one or more processors that are incorporated into, or are associated with, parallelly coupled addressable network switching device 10 or network switch 12. Switch processor 13 may control operation of network switch 12 or other components of parallelly coupled addressable network switching device 10. For example, switch processor 13 may be configured to process a data signal and route the signal in accordance with a result of the processing.

Switch processor 13 may communicate with data storage device 15. For example, data storage device 15 may include one or more fixed or removable non-volatile data storage devices or media. Data storage device 15 may be used to store programming instructions, parameters, or data for use in operation of switch processor 13. Switch processor 13 may further communicate with memory 17. Memory 17 may include one or more volatile or nonvolatile memory devices. Memory 17 may be used to store programming instructions, results of computations, or data or parameters during operation of switch processor 13. For example, data storage device 15 or memory 17 may be used to store addresses of network ports 20 on network switch 20, or on network switches of external switching devices.

Parallelly coupled addressable network switching device 10 includes two or more stacking ports 16. A stacking port 16 may include, be incorporated into, or communicate with, a stacking module. A stacking module may include an appropriate coupler for sensing and transmitting a data signal for a stack of connected addressable network switching devices 10. For example, a stacking port 16 may include or communicate with a device for converting an optical signal to an electric signal, or vice versa. Each stacking port 16 may be provided with an appropriate connector for connecting to an end of a stacking cable. A second end of the stacking cable may be similarly connected to a stacking port of another parallelly coupled addressable network switching device 10, or to an external network switch of another type.

Stacking port 16 is connected to internal communication line 18. Internal communication line may include a coaxial cable or other electrically conducting line, an optical fiber, or any other suitable form of signal transmitting medium. For example, internal communication line 18 may be configured to transmit an FDM signal.

Internal communication line 18 may connect, or be coupled two, two (or more) stacking ports 16 of parallelly coupled addressable network switching device 10. Thus, a data signal may be transmitted from a stacking port 16 to internal communication line 18. Similarly, a data signal may be transmitted from one stacking port 16 to another stacking port 16 via internal communication line 18, independent of the functioning of other components of parallelly coupled addressable network switching device 10.

For example, a first stacking port 16 of parallelly coupled addressable network switching device 10 may be connected via a stacking cable to a first external network switching device. Similarly, a second stacking port 16 of parallelly coupled addressable network switching device 10 may be connected via a stacking cable to second external network switching device. Thus, the first external network switching device may transmit a signal to the second external network switching device via stacking ports 16 and internal communication line 18.

Network switch 12 may connect to internal communication line 18 via parallelly coupled addressable interface 14. Parallelly coupled addressable interface 14 may include a wide band receiver, or receiving function. In accordance with the frequency selective receiving function, a data signal may be transmitted from internal communication line 18 to network switch 12 via parallelly coupled addressable interface 14 when the data signal conforms to predetermined selection criteria. For example, the receiving function of parallelly coupled addressable interface 14 may be configured to receive data that is addressed to the MAC address of network switch 12. Thus, parallelly coupled addressable interface 14 may transmit a continuous data signal from internal communication line 18 to network switch 12 only when the demodulated signal includes the MAC address of network switch 12.

In this manner, when a data signal is received by parallelly coupled addressable network switching device 10 via a stacking port 16, the signal may be transmitted to network switch 12 if the signal conforms to the selection criteria of parallelly coupled addressable interface 14. The parallel coupling of parallelly coupled addressable interface 14 may not affect transmission of signals along internal communication line 18. Thus, the signal may continue to be transmitted along internal communication line 18 to another stacking port 16. From there, the signal may be transmitted along an external cable to an external switching device of the stack, or to another device.

Similarly, parallelly coupled addressable interface 14 may include function of a transmitter, or a transmitter function. When functioning as a transmitter, a data signal received via a by network data port 20 of network switch 12 may be transmitted to internal communication line 18. For example, an assigned carrier frequency may be modulated to encode data from the received data signal. The transmitted signal may be conducted by internal communication line 18 to a stacking port 16 of parallelly coupled addressable network switching device 10. From the stacking port 16, the signal may be transmitted via a stacking cable to an external network switching device of a switch stack, e.g. utilizing FDM.

Figure 1B:
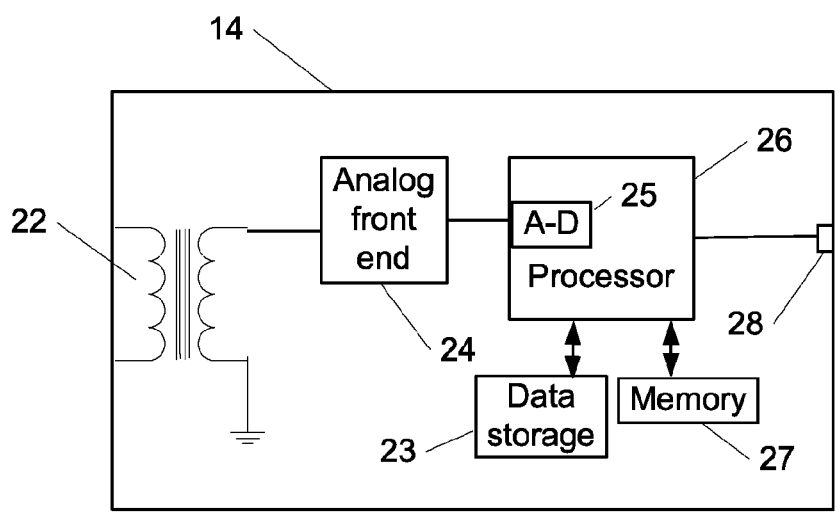
FIG. 1B is a schematic drawing of an example of a parallelly coupled interface.

FIG. 1B is a schematic drawing of an example of an parallelly coupled addressable interface. Reference is also made to components shown in FIG. 1A.

A receiving function of parallelly coupled addressable interface 14 may be configured to selectively receive a data signal from internal communication line 18 for transfer to a network switch 12 of an parallelly coupled addressable network switching device 10.

For example, an appropriate coupling device, represented by coupling transformer 22 may be connected to an analog signal line, e.g. internal communication line 18. If internal communication line 18 represents a communication media other than an electrical conductor or cable, a type of coupling device appropriate to the internal may be used. For example, if internal communication line 18 represents an optical medium (e.g. optical fiber or conduit), an appropriate optical receiver (or transceiver) may be included in place of a coupling transformer.

A received signal may be processed by analog front end 24. For example, analog front end 24 may include circuitry for detecting a carrier frequency and for demodulating a received modulated carrier signal.

The extracted modulation signal may be conducted to analog-digital converter 25. Analog-digital converter 25 may digitize the demodulated signal. The digitized signal may be processed by interface processor 26. For example, interface processor 26 may operate in accordance with programmed instructions.

Interface processor 26 may communicate with data storage device 23. For example, data storage device 23 may include one or more fixed or removable non-volatile data storage devices or media. Data storage device 23 may be used to store programming instructions, parameters, or data for use in operation of interface processor 26. Interface processor 26 may further communicate with memory 27. Memory 27 may include one or more volatile or nonvolatile memory devices. Memory 27 may be used to store programming instructions, results of computations, or data or parameters during operation of interface processor 26. For example, data storage device 23 or memory 27 may be used to store a carrier frequency that is assigned to parallelly coupled addressable interface 14, or to communication with a parallelly coupled addressable interface of an external addressable switching device.

For example, interface processor 26 may be configured to process a digitized signal so as to convert the digitized signal to a form suitable for use in network communications. For example, interface processor 26 may format the information content of the digitized signal in an appropriate packet format. The processed signal may be output via digital port 28, e.g. for transmission to network switch 12.

Interface processor 26 may also control other components of parallelly coupled addressable interface 14. For example, interface processor 26 may control a modulator of analog front end 24 to modulate an assigned carrier frequency.

Similarly, a transmitting function of parallelly coupled addressable interface 14 may be configured to receive a data signal from network switch 12 and transmit the signal to internal communication line 18. For simplicity, FIG. 1B shows components of parallelly coupled addressable interface 14 serving both the receiving and transmitting functions of parallelly coupled addressable interface 14. The receiving and transmitting functions of parallelly coupled addressable interface 14 the functions may share some or all components of parallelly coupled addressable interface 14, may utilize separate components, or may utilize separate subcomponents (e.g. circuitry) of the components.

For example, when a transmitting function of parallelly coupled addressable interface 14 is operating, a digital signal from network switch 12 may be input via digital port 28. The digital signal may be processed (e.g. analyzed) by interface processor 26. For example, the digital signal may be incorporated into a data packet with a suitable header. For example, the header may include a MAC address of a destination external network switch device, or may specify a destination network port. For example, the digital signal may be digitally filtered, or otherwise converted to a form suitable for conversion to an analog signal. For example, the signal may be converted to a signal suitable for pulse-width modulation.

The processed digital signal may be converted to an analog signal by analog-digital converter 25. Analog front end 24 may modulate a suitable carrier signal (e.g. having a carrier frequency that corresponds to a destination external addressable network switching device) with the analog signal. The modulated analog signal may then be transmitted to internal communication line 18 via coupling transformer 22.

Figure 2:
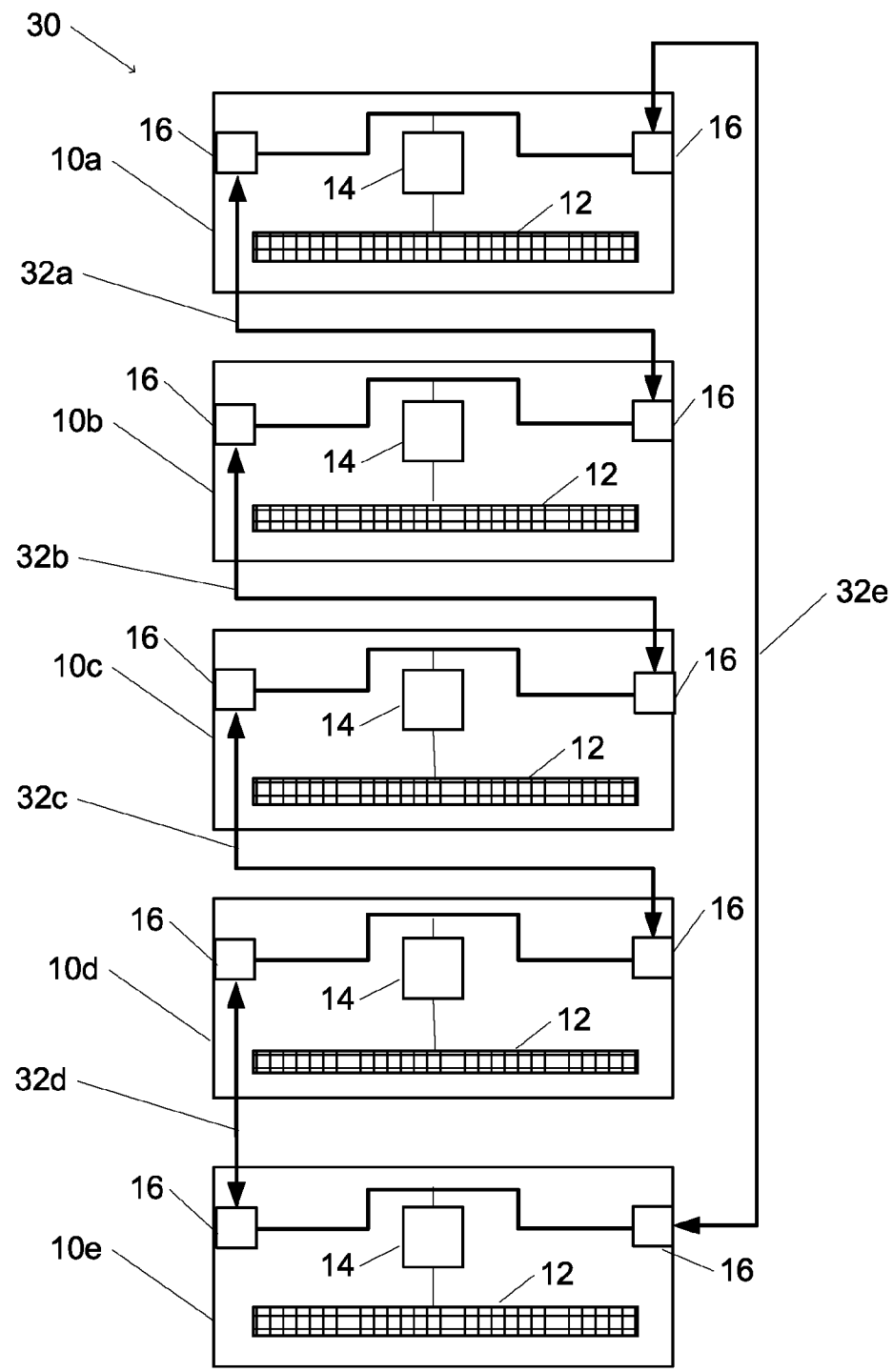
FIG. 2 is a schematic drawing of an example of a stack of parallelly coupled network switching devices.

Examples of parallelly coupled individually addressable network switching devices may be stackable. FIG. 2 is a schematic drawing of an example of a stack of parallelly coupled network switching devices.

Switch stack 30 includes two or more (five, in the example shown in FIG. 2, other numbers may be used) parallelly coupled addressable network switching devices 10a to 10e. In the example shown, all of the network switches in the stack are incorporated into parallelly coupled addressable network switching devices 10a to 10e. However, in other examples of a switch stack, a portion of the switches in the stack may be of another type.

Each stacking port 16 of each of parallelly coupled addressable network switching devices 10a to 10e is connected to a stacking port 16 of another of parallelly coupled addressable network switching devices 10a to 10e by a stacking cable 32a to 32b.

Each network port 20 (FIG. 1A) of a network switch 12 of parallelly coupled addressable network switching devices 10a to 10e may be connected to a network cable. Thus, a network signal that is received by a network port 20 of one of parallelly coupled addressable network switching devices 10a to 10e may be routed via switch stack 30 to any other network port 20 of any of parallelly coupled addressable network switching devices 10a to 10e.

In the example shown, each of parallelly coupled addressable network switching devices 10a to 10e is connect to each other of parallelly coupled addressable network switching devices 10a to 10e by two paths. For example, by a first, shortest path, parallelly coupled addressable network switching device 10b is connected to of parallelly coupled addressable network switching device 10d via stacking cable 32b, parallelly coupled addressable network switching device 10c, and stacking cable 32c. By a longer path, parallelly coupled addressable network switching device 10b is connected to of parallelly coupled addressable network switching device 10d via stacking cable 32a, parallelly coupled addressable network switching device 10a, stacking cable 32e, parallelly coupled addressable network switching device 10e, and stacking cable 32d.

Were parallelly coupled addressable network switching devices 10a to 10e to be connected in series, as in some prior art devices, such redundancy would be necessary to insure communication e.g. between parallelly coupled addressable network switching device 10b and parallelly coupled addressable network switching device 10d in the event of failure of parallelly coupled addressable network switching device 10c. In such a case, a less efficient long path could be substituted for a more efficient short path.

However, in accordance with an example of parallelly coupled addressable network switching devices, such redundancy may not be necessary to ensure communication. For example, in the event of failure of parallelly coupled addressable interface 14 or network switch 12 of parallelly coupled addressable network switching device 10c, a signal may continue to be transmitted via internal communication line 18 (FIG. 1A) of parallelly coupled addressable network switching device 10c. Thus, communication may not be interrupted by the failure. (Access to network cables connected to network ports 20 of network switch 20 of parallelly coupled addressable network switching device 10c may, however, be interrupted.)

Communication between each pair of parallelly coupled addressable network switching devices 10a to 10e may be assigned one or more signal frequencies. Thus, a signal may be transmitted by any of parallelly coupled addressable network switching devices 10a to 10e with a carrier frequency that is substantially equal to one of the assigned signal frequencies of the transmitting device. This may enable concurrent transmission of multiple data signals by stacking cables 32a to 32b, e.g. by utilizing FDM. Each of parallelly coupled addressable network switching devices 10a to 10e may read the signal as it traverses that device. However, if the signal is not addressed to that device (e.g. a packet header does not include the MAC address of that device) the packet may be ignored by the parallelly coupled addressable interface 14 of that device. if the signal is addressed to that device, parallelly coupled addressable interface 14 of that destination device may transmit the demodulated signal to the network switch 12 of the destination device. A processor, e.g. processor 13 (FIG. 1A) associated with network switch 12 of the destination device may route the signal to one of the network ports 20 of the destination network switch 12.

For example, one of parallelly coupled addressable network switching devices 10a to 10e, e.g. parallelly coupled addressable network switching device 10e, may be configured to operate as a master device, and the other devices, e.g. addressable network switching devices 10a to 10d, may be configured to operate as slave devices. For example, the master device may communicate with the slave devices, and assign one or more carrier frequencies to communication between each pair of devices. The frequencies that are assigned to each of the devices (both master and slave devices) may be communicated to all of the devices. A table (or other list or database) of assigned frequencies may be stored in a memory device or storage device of each of parallelly coupled addressable network switching devices 10a to 10e. Alternatively, the table may be stored in a data storage device that is accessible by each of parallelly coupled addressable network switching devices 10a to 10e.

A processor of an example of an individually addressable network switching device may operate in accordance with a method. The method may enable coordinated operation of all individually addressable network switching devices in a stack.

Figure 3:
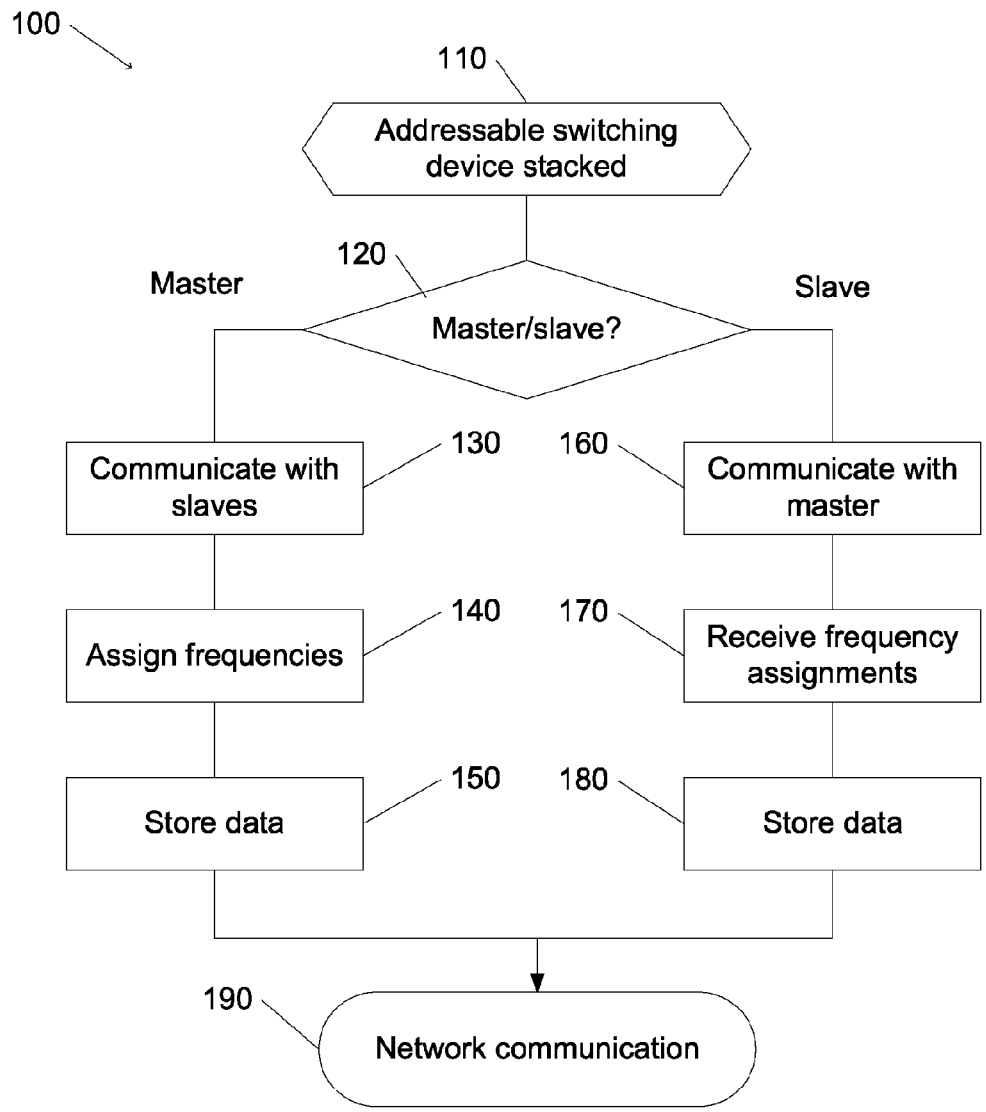
FIG. 3 is a flowchart of an example of a method for controlling operation of an parallelly coupled network switching device.

FIG. 3 is a flowchart of an example of a method for controlling operation of an parallelly coupled addressable network switching device.

It should be understood with respect to this flowchart and all accompanying flowcharts that division of the illustrated method into the discrete operations that are represented by separate blocks is for convenience only. Alternative division into operations is possible with equivalent results. Such alternative divisions into operations represent other examples of the illustrated method. Similarly, unless indicated otherwise, the order of operations as indicated by placement of the blocks of the flowchart has been selected for convenience only. Operations of the method may be executed in an alternative order, or concurrently, with equivalent results. Such alternative ordering of operations represent other examples of the illustrated method.

Parallelly coupled addressable network switching device control method 100 may be performed when a stack of individually addressable network switching devices is activated (e.g. powered). Parallelly coupled addressable network switching device control method 100 may also be performed at predetermined intervals during operation of a switch stack, or in response to predetermined events (e.g. detected failure of a component or connection of a component).

Parallelly coupled addressable network switching device control method 100 may be performed by a processor of a parallelly coupled addressable network switching device (e.g. network switch processor 13 in FIG. 1A, or parallelly coupled addressable interface processor 26 in FIG. 1B). Parallelly coupled addressable network switching device control method 100 may be performed when the parallelly coupled addressable network switching device with which the processor is associated is connected via a stacking port to a switch stack (block 110).

The individually addressable network switching device with which the processor is associated may be designated to operate as a master device of the switch stack (block 120, and further described below). For example, a parallelly coupled addressable network switching device may be designated as a master device by a human operator, or automatically in accordance with predetermined criteria. Other parallelly coupled addressable network switching devices of the stack may then be designated to operate as slave devices.

All or some of the parallelly coupled addressable network switching devices may be configurable to operate as either master or slave devices. For example, if failure of the master device is detected by such a device that is operating as a slave device, the detecting device may begin to operate as a master device.

The master device may then communicate with the slave devices (block 130). For example, appropriate signals may be sent to, and received from, each of the slave devices. For example, such communication may identify the slave devices and their network ports.

The master device may then assign an exclusive set of transmission frequencies to to each of the slave devices (block 140). For example, an assignment of a frequency may be communicated to all of the slave devices.

The master device may store the frequency assignments, as well as other data (e.g. network port addresses) for use in network switching (block 150). The master device may then configure a transmitting receiving function of its parallelly coupled addressable interface to modulate the carrier frequencies that are assigned to it.

Thus, the master device may operate to participate in network communications (block 190). For example, the master device may receive via a network port a data signal that is to be routed to one of the slave devices. The master device may combine the data signal (e.g. in the form of a data packet that includes a MAC address of the destination slave device in the packet header) with a carrier signal of the frequency that was assigned to the master device and transmit the modulated signal.

If not designated to operate as a master device, the parallelly coupled addressable network switching device with which the processor is associated may be designated to operate as a slave device of the switch stack (block 120). For example, operation as a slave device may be a default configuration unless designated to operate as a master device.

The slave device may communicate with the master device (block 160). For example, appropriate signals may be sent to, and received from, the master device or other slave devices. For example, such communication may identify the master and slave devices and their network ports.

An exclusive frequency assignment may be received from the master device (block 170). The communication may include, in addition, frequency assignments and network port addresses (or designations) for the master device and each of the other slave devices.

The slave device may store its own and other frequency assignments, as well as other data (e.g. network port addresses) for use in network switching (block 180).

Figure 4:
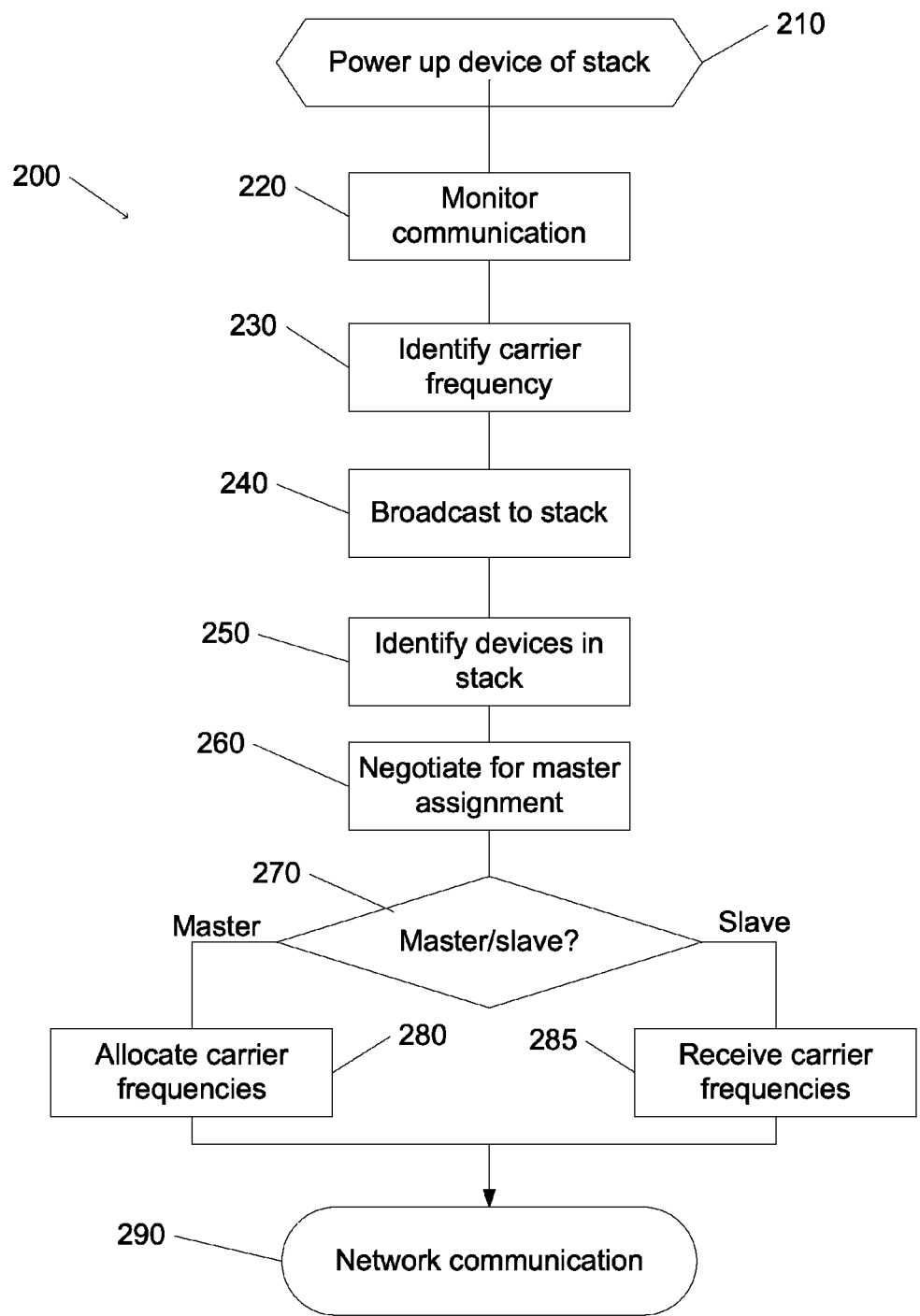
FIG. 4 is a flowchart of an example of a method for controlling operation of an example of a parallelly coupled addressable network switching device when starting up.

Thus, the slave device may operate to participate in network communications (block 190). For example, the slave device may receive via a network port a data signal that is to be routed to the master device or another of the slave devices. The receiving slave device may combine the addressed data signal with an assigned carrier signal of the frequency to which the receiving slave device was assigned and transmit the modulated signal. The transmitted modulated signal may be exclusively received by the appropriate destination device. For example, Designation of an example of a parallelly coupled addressable network switching device may be performed as the device is started up. FIG. 4 is a flowchart of an example of a method for controlling operation of an example of a parallelly coupled addressable network switching device when starting up.

Startup method 200 may be executed by a processor associated with an example of a parallelly coupled addressable network switching device that is connected to a stack of network switching devices. Operations of startup method 200 may be executed when the device is started up (block 210).

The device may monitor communication within the stack (block 220). Monitoring the stack communications may indicate which carrier frequencies are used by devices within the stack. One of the carrier frequencies in use may be identified for use in initial communication (block 230), e.g. from a predetermined set of frequencies. The device may then broadcast to the stack (block 240). For example, the device may broadcast a MAC address or other identifying or characterizing information. Other devices may be concurrently broadcasting similar information.

In this manner, the device may receive information to enable identifying all of the devices in the stack (block 250). For example, MAC addresses of all of the devices may be identified.

The device may exchange information ("negotiate") in order to assign one of the intercommunicating network switching devices to operate as a master device (block 260). For example, a device may be assigned to operate as a master device based on predetermined criteria (e.g. a first device to power up or other criteria). Assignment of a master device may be at least partially based on a manual assignment or priority by a human operator of one of the devices.

Further operation of the device may be based on whether device was assigned to operate as a master device or as a slave device (block 270). If a master device, the master device may allocate (herein referring to a unique assignment of carrier frequencies to each device) a set of carrier frequencies to itself and to every slave device in the stack (block 280). The master device may operate to participate in network communication (block 290). For example, the master device may transmit data signals that modulate one of its allocated carrier frequencies.

If the device that is executing operations of startup method 200 has been assigned to operate as a slave device, the slave device waits to receive a set of allocated carrier frequencies from the master device (block 285). When the set of allocated carrier frequencies is received, the slave device may operate to participate in network communication (block 290).

In accordance with an example of stacking or individually addressable network switching devices, a computer program application stored in non-volatile memory or computer-readable medium (e.g., register memory, processor cache, RAM, ROM, hard drive, flash memory, CD ROM, magnetic media, etc.) may include code or executable instructions that when executed may instruct or cause a controller or processor to perform methods discussed herein, such as an example of a method to control operation of an individually addressable network switching device.

The computer-readable medium may be a non-transitory computer-readable media including all forms and types of memory and all computer-readable media except for a transitory, propagating signal. In one implementation, external memory may be the non-volatile memory or computer-readable medium.

We claim:

1. A network switching device comprising:
    at least two stacking ports, each stacking port being connectable via a stacking cable to a stack including at least one external network switching device;
    an internal communication medium coupled to said at least two stacking ports and capable of transmitting a frequency division multiplexed signal between said at least two stacking ports;
    a network switch; and
    an interface to enable communication between the network switch and the internal communication medium, the interface including a parallel coupling to the internal communication medium such that a signal with one carrier frequency being communicated between the network switch and the internal communication medium does not interfere with transmission between said at least two stacking ports of a signal with a different carrier frequency.

2. The device of claim 1, wherein internal communication medium comprises an electrically conducting cable and the parallel coupling comprises a coupling transformer.

3. The device of claim 1, wherein the interface comprises a broad band receiver for receiving all carrier frequencies that are transmitted in the stack.

4. The device of claim 1, wherein the interface is configured to transmit a signal to from the internal communication medium to the network switch when the signal is addressed to the network switch.

5. The device of claim 4, wherein the signal is addressed to the network switch when the signal incorporates a MAC address of the network switch.

6. The device of claim 1, wherein the interface is configured to modulate a generated carrier frequency with a signal received from a network via the network switch.

7. The device of claim 6, wherein the generated carrier frequency is selectable to an allocated carrier frequency.

8. The device of claim 1, wherein a processor of the device is configurable to operate the device as a master device to allocate a carrier frequency to an external switching device of the stack.

9. The device of claim 1, wherein a processor of the device is configurable to operate the device as a slave device to be allocated a carrier frequency by an external switching device of the stack.

10. The device of claim 1, wherein the interface comprises a transceiver chip.

* * * * *